United States Patent [19]

Keys

[11] Patent Number: 4,970,101

[45] Date of Patent: Nov. 13, 1990

[54] LAMINATE FLEXIBLE STRIP AND METHOD FOR MAKING SAME

[75] Inventor: James F. Keys, West Bloomfield, Mich.

[73] Assignee: The Standard Products Company, Cleveland, Ohio

[21] Appl. No.: 307,346

[22] Filed: Feb. 6, 1989

[51] Int. Cl.$^5$ .............................................. B23B 3/10
[52] U.S. Cl. ..................................... 428/110; 428/122
[58] Field of Search ..................... 428/1073, 109, 110, 428/113, 122; 52/716; 49/490

[56] References Cited

U.S. PATENT DOCUMENTS

| | | | |
|---|---|---|---|
| 2,026,971 | 1/1936 | Greene | 428/122 |
| 3,197,821 | 8/1965 | Bright | 20/69 |
| 3,222,769 | 12/1965 | Le Plae | 428/122 |
| 3,310,923 | 3/1967 | Weimar | 52/716 |
| 4,099,765 | 7/1978 | Bright | 428/122 |
| 4,297,402 | 10/1981 | Kinbara et al. | 428/110 |
| 4,413,033 | 11/1983 | Weichman | 428/122 |

Primary Examiner—Alexander S. Thomas
Attorney, Agent, or Firm—Harness, Dickey & Pierce

[57] ABSTRACT

A laminate flexible strip includes a core member having a cover layer disposed about the core member. The core member comprises a plurality of longitudinally spaced clamping clips and a plurality of laterally spaced fibers attached to the clips to allow the core to flex longitudinally and laterally.

3 Claims, 1 Drawing Sheet

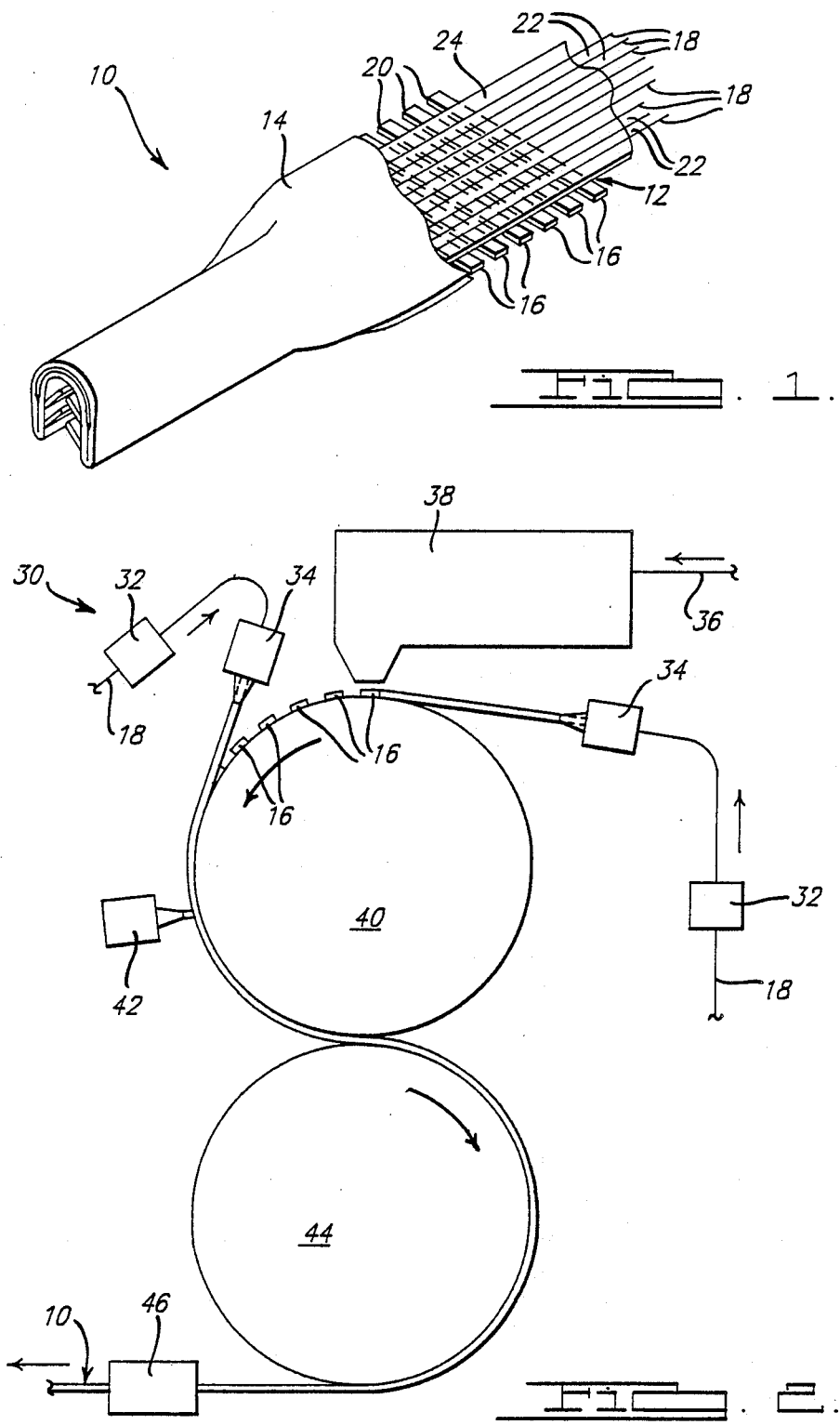

LAMINATE FLEXIBLE STRIP AND METHOD FOR MAKING SAME

BACKGROUND OF THE INVENITON

The present invention relates to a laminate flexible strip. More particularly, the present invention relates to trim strips adapted to automotive vehicles.

Laminated trim strips have been used in the past to act as a sealing strip around a door in a vehicle. Typically, the trim strip comprises a core member having a cover layer disposed about the core member. Examples of such trim strips are disclosed in U.S. Pat. Nos. 3,197,821, issued Aug. 3, 1965, to Bright; 3,310,928, issued Mar. 28, 1967, to Weimar; and 4,413,033, issued Nov. 1, 1983, to Weichman.

The problem with such trim strips is that the core member may be flexible in only one direction, such as longutindally. Also, woven wire cores must use non-functional wire connecting loops. Similarly, stamped cores may waste up to 50% of the material in slug loss and non-functional connecting strips. This results in less than 100% material utilization. Further, the core members are complex and costly to manufacture.

SUMMARY OF THE INVENTION

A laminate flexible strip includes a core member having a cover layer disposed about the core member. The core member comprises a plurality of longitudinally spaced clamping clips and a plurality of laterally spaced fibers attached to the clips to allow the core to flex longitudinally and laterally.

Accordingly, the present invention allows the core member to flex longitudinally and laterally. Also, the core member has 100% material utilization. Further, the core member of the present invention is simpler and less expensive to manufacture than conventional cores.

FIGURES IN THE DRAWINGS

Other advantages of the present invention will be readily appreciated as the same becomes better understood by reference to the following detailed description when considered in connection with the accompanying drawings wherein:

FIG. 1 is a partial fragmentary view of the present invention; and

FIG. 2 is a schematic illustrating the method of making the present invention of FIG. 1.

DESCRIPTION OF THE PREFERRED EMBODIMENT

A laminate flexible strip for attachment to a vehicle (not shown) is generally shown at 10 in FIG. 1. The strip 10 comprises a core member, generally indicated at 12, and a cover layer 14 of elastomeric material disposed about the core member 12. The core member 12 comprises a plurality of discontinuous or non-connected longitudinally spaced and laterally extending metal clamping clips 16 and a plurality of continuous laterally spaced and longitudinally extending linear fibers 18 connected to the clips 16 to allow the core 12 to flex longitudinally and laterally. The fibers 18 may be made of a material dissimilar from the clips 16.

The core member 12 includes first apertures 20 between the clips 16 and second apertures 22 formed between the fibers 18. The clips 16 are secured to the fibers 18 by an adhesive potting laminate. A filler material 24 is filled in the first 20 and second 22 apertures to present a smooth, continuous outer surface on the cover layer 14. In other words, the filler material 24 is disposed in the first 20 and second 22 apertures to eliminate a hungry horse effect on the outer surface of the cover layer 14 by the cover layers 14 sinking into the apertures 20, 22 when the core member 12 is formed or bent to a predetermined configuration such as a "U" shape.

Accordingly, a method of making a laminate flexible strip 10 for attachment to a vehcile is provided. An apparatus for performing the method is generally shown at 30 in FIG. 2. The method comprises the steps of forming a core member 12 comprising a plurality of laterally spaced fibers 18 and a plurality of longitudinally spaced clamping clips 16. The steps include forming a cover layer 14 about the clips 16 and fibers 18 to form a strip 10 which is flexible longitudinally and laterally. More specifically, the steps include tensioning the fibers 18 in die 32 and extruding the fibers 18 by a fiber-coating cross-head extrusion 34. The steps further include feeding a metal stock 36 such as a strip to a cutting device 38 and cutting the stock 36 to a predetermined length with the cutting device 38 to form the clips 16. The steps include feeding the clips 16 to a magnetic roll 40. The clips 16 are held to the roll 40 by magnetic attraction. The roll 40 rotates as the fibers 18 are extruded and placed on the clips 16. The steps further include filling apertures 20, 22 between the clips 16 and fibers 18 by extruding a filler material 24 from die 42. The filler material 24 is formed to the proper thickness between the roll 40 and a rotating gage roll 44. The core 12 is temperature conditioned at 46. Finally, the steps include extruding an elastomeric cover layer 14 about the clips 16 and fibers 18.

The present invention has been described in an illustrative manner, and it is to be understood that the terminology which has been used is intended to by in the nature of words of description rather than of limitation.

Obviously, many modifications and variations of the present invention are possible in light of the above teachings. It is, therefore, to be understood that within the scope of the appended claims, the present invention may be practiced otherwise than as specifically described.

What is claimed is:

1. A laminate flexible strip for attachment to a vehicle comprising:

a core member;

a cover layer disposed about said core member;

said core member comprising a plurality of separate discontinuous longitudinally spaced and laterally extending clamping clips, each of said clamping clips having two sides, and a plurality of separate laterally spaced and continuously longitudinally extending linear fibers connected to the same side of said clamping clips to allow said core to flex longitudinally and laterally;

said clamping clips and said fibers being spaced to form at least one first aperture longitudinally between said clips and to form at least one second aperture laterally between said fibers;

securing means for securing said fibers to said same side of said clamping clips; and said clamping clips being made of a material dissimilar from said fibers to allow said core member to flex longitudinally and laterally.

2. A strip as set forth in claim 1 including filler means for filling said first and second apertures to present a smooth continuous outer surface on said cover layer.

3. A laminate flexible strip comprising:
a core member;
said core member comprising a plurality of separate discontinuous longitudinally spaced and laterally extending clamping clips, each of said clamping clips having two sides, and a plurality of separate continuous laterally spaced and longitudinally extending linear strength fibers;
securing means for securing said fibers to said same side of said clamping clips;
a cover layer disposed about said clamping clips and said fibers and being made of an elastomeric material;
said clamping clips and said fibers being spaced to form at least one first aperture longitudinally between said clips and to form at least one second aperture laterally between said fibers;
a filler material disposed in said first and second apertures to present a smooth continuous outer surface on said cover layer; and
said clamping clips being made of a material dissimilar from said fibers to allow said core member to flex longitudinally and laterally.

* * * * *